US008554154B1

(12) United States Patent
Everson et al.

(10) Patent No.: US 8,554,154 B1
(45) Date of Patent: Oct. 8, 2013

(54) CONNECTOR SUPPORTING INTEGRATED RADIO FREQUENCY AND BASEBAND DATA

(75) Inventors: John M. Everson, Leawood, KS (US); Bradley A. Kropf, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 573 days.

(21) Appl. No.: 12/725,447

(22) Filed: Mar. 16, 2010

(51) Int. Cl.

| | |
|---|---|
| ***H04B 1/38*** | (2006.01) |
| ***H04B 1/44*** | (2006.01) |
| ***H04M 1/00*** | (2006.01) |

(52) U.S. Cl.
USPC .......... 455/73; 455/557; 455/558; 455/562.1; 455/83; 455/575.7

(58) Field of Classification Search
USPC ........................................................... 455/73
See application file for complete search history.

(56) References Cited

U.S. PATENT DOCUMENTS

| | | | | |
|---|---|---|---|---|
| 6,434,011 | B1 * | 8/2002 | Jenkins et al. | 361/752 |
| 6,792,256 | B1 | 9/2004 | Kinney et al. | |
| 7,181,236 | B1 * | 2/2007 | Truong et al. | 455/550.1 |
| 2002/0101378 | A1 * | 8/2002 | Quinn et al. | 343/702 |
| 2003/0060233 | A1 * | 3/2003 | Masaki et al. | 455/558 |
| 2004/0225786 | A1 * | 11/2004 | Puupponen et al. | 710/240 |
| 2006/0035670 | A1 * | 2/2006 | Souissi et al. | 455/557 |
| 2009/0262669 | A1 * | 10/2009 | Sanders | 370/278 |

* cited by examiner

*Primary Examiner* — Temesgh Ghebretinsae
*Assistant Examiner* — Devan Sandiford

(57) ABSTRACT

An electronic device is provided. The device comprises a radio transceiver, a processor, a memory, a connector, and an application stored in the memory. The connector is for coupling a radio frequency signal between the radio transceiver and an external antenna and for coupling a baseband signal between the first processor and an external processor. The application, when executed by the processor, manages the radio transceiver based on baseband messages received over the connector from the external processor, wherein the application managing the radio transceiver comprises causing the radio transceiver to transmit the radio frequency signal over the connector to the external antenna and causing the radio transceiver to receive the radio frequency signal over the connector from the external antenna.

20 Claims, 5 Drawing Sheets

Fig. 4
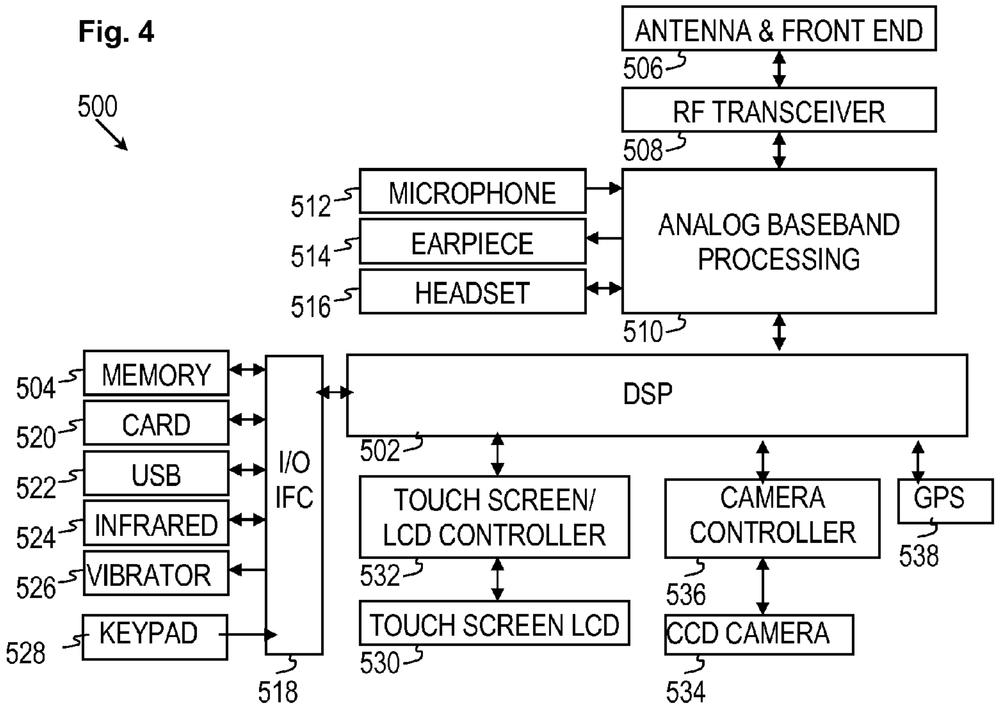
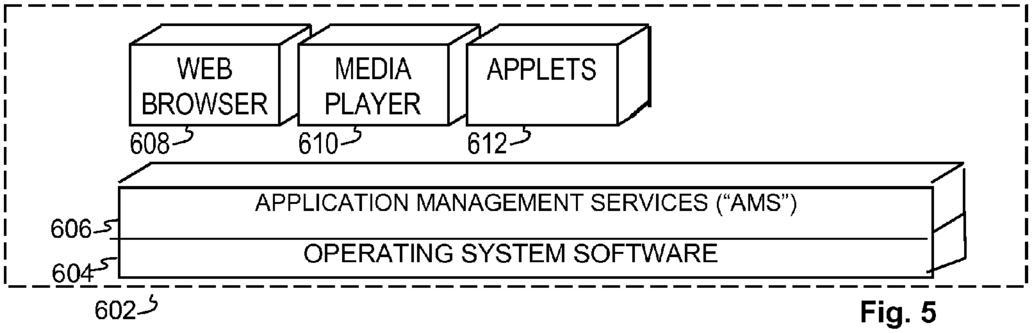
Fig. 5

CONNECTOR SUPPORTING INTEGRATED RADIO FREQUENCY AND BASEBAND DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication networks provide nearly ubiquitous connectivity to computers and other electronic devices. Wireless communication networks increasingly are deploying broadband data communication equipment to promote high speed access to data such as text content, graphical content, video content, audio content, and other media content. Wireless communication involves transmitting and receiving radio waves using antennas. An antenna may be abstracted or conceptualized as a bridge between communication circuits, for example wires, coaxial cables, wave guides, strip lines, and the like and the free space in which radio waves propagate.

SUMMARY

In an embodiment, an electronic device is disclosed. The device comprises a radio transceiver, a processor, a memory, a connector, and an application stored in the memory. The connector is for coupling a radio frequency signal between the radio transceiver and an external antenna and for coupling a baseband signal between the first processor and an external processor. The application, when executed by the processor, manages the radio transceiver based on baseband messages received over the connector from the external processor, wherein the application managing the radio transceiver comprises causing the radio transceiver to transmit the radio frequency signal over the connector to the external antenna and causing the radio transceiver to receive the radio frequency signal over the connector from the external antenna.

In an embodiment, a system is disclosed. The system comprises a first computer and an electronic device. The first computer comprises a package housing a first processor, a first memory, and a first connector coupled to the first processor and to a first antenna. The electronic device comprises a radio transceiver, a second processor, a second memory, a second connector, and an application stored in the second memory. The second connector is for coupling a radio frequency signal between the radio transceiver and the first connector and for coupling a baseband signal between the second processor and the first connector. The application, when executed by the second processor, controls the radio transceiver based on baseband messages received from the first processor, wherein the application controlling the radio transceiver comprises causing the radio transceiver to transmit the radio frequency signal over the second connector to the external antenna and causing the radio transceiver to receive the radio frequency signal over the second connector from the external antenna. The package receives the electronic device in a recessed compartment.

In an embodiment, an electronic device is disclosed. The electronic device comprises a processor, a memory, a connector, and an application stored in the memory. The connector is for coupling the electronic device to a first computer, the connector comprising a first contactor and a second contactor for coupling a first radio frequency signal between the electronic device and the first computer and comprising a third contactor for coupling a baseband signal between the electronic device and the first computer. The application, when executed by the processor, manages the generation of the first radio frequency signal based on the baseband message received from the first computer.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 4 is a block diagram of a handset according to an embodiment of the disclosure.

FIG. 5 is an illustration of a software architecture of a handset according to an embodiment of the disclosure.

DETAILED DESCRIPTION

Figure 1:
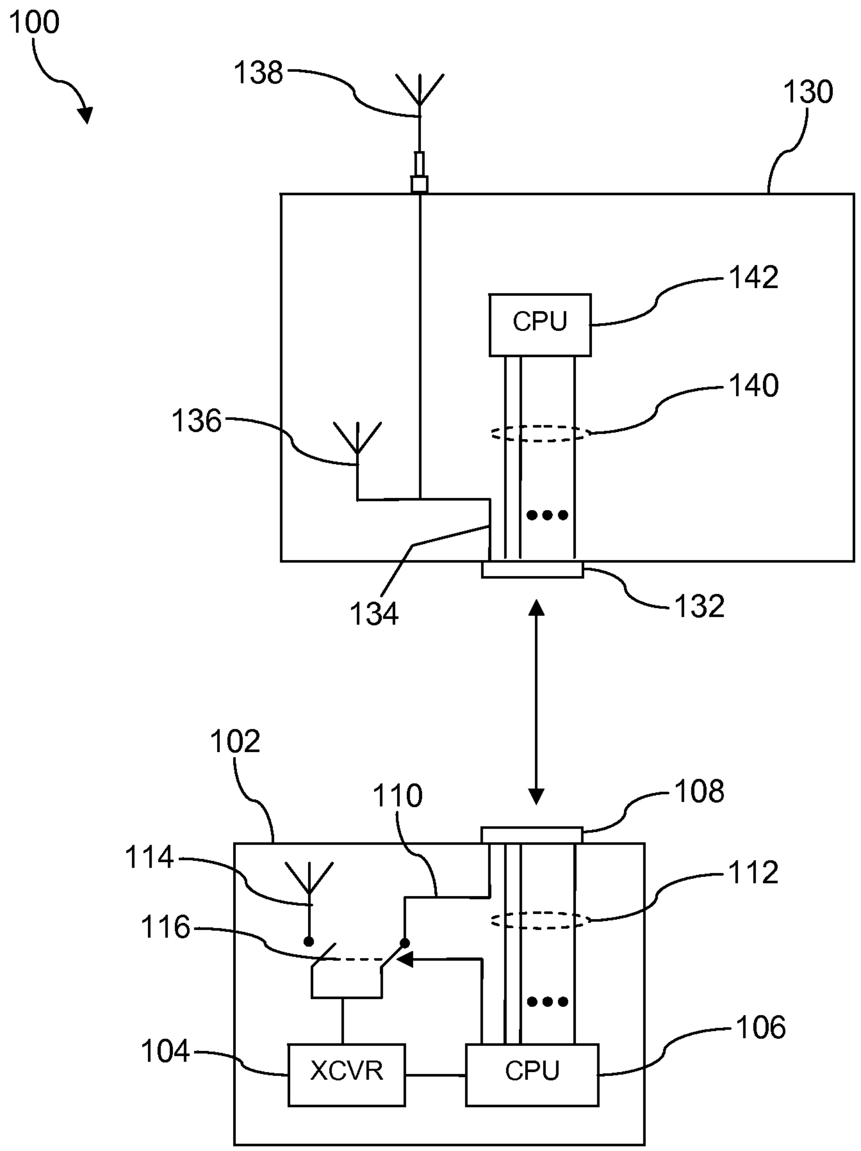
FIG. 1 is an block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches coupling a portable electronic device comprising a radio transceiver to another electronic device via a standard connector, whereby the radio transceiver transmits and receives radio frequency signals via one or more of the contacts or contactors of the connector that is coupled to an antenna. The antenna may be embedded or contained within the other electronic device. Alternatively, the antenna may be an external antenna that is coupled or connected to the other electronic device. The standard connector further provides base-band communication, for example commands from the other electronic device to the portable electronic device, via other contacts. The standard connector may comprise one radio frequency contact, two radio frequency contacts, four radio frequency contacts, or some other number of radio frequency contacts. The multiple radio frequency contacts may be used for transmit versus receive operations using a single antenna. Alternatively, the multiple radio frequency contacts may be used to couple to multiple antennas. The multiple antennas may be used for radio communications according to different radio communication protocols and/or for multiple input/multiple output (MIMO) radio communication techniques.

In an embodiment, the portable electronic device may be a radio card, the other electronic device may be a laptop computer or a desktop computer, and the radio card couples to the computer. The radio card may comprise a radio transceiver that provides wireless communication service to the computer based on a wireless communication subscription account associated with the radio card. The radio card transmits and/or receives via an antenna embedded in the computer or coupled to the computer. The radio card may be employed by a user to provide wireless communication services, based on a single subscription account, to a succession of computers, for example a computer at the user's workplace, a computer embedded in the user's automobile, a home computer at the user's residence, a borrowed computer in a public location, and other computers. Alternatively, the portable electronic device may be a mobile phone or other communication device. The other electronic device may be a data communications router or other networking equipment.

In an embodiment, a computer may provide a recess to receive the portable electronic device in an at least partially protected or sheltered position, for example less exposed to dropped articles or moving articles such as a reference book stored beside a desktop computer or a laptop computer being carried in an airport waiting area. The recess may include a standard connector that mates to the standard connector of the portable electronic device. The recess may be accessed via a removable door or hinged door that may be closed after the portable electronic device has been installed in the recess, thereby further protecting the portable electronic device. The protected position provided by the recess reduces the risk of breakage or loss of the portable electronic device. On the other hand, the location of the portable electronic device in the recess, either covered or uncovered, may hinder the effectiveness of an antenna integrated with the portable electronic device. Coupling the portable electronic device to the standard connector and to one or more antennas integrated with the computer or coupled to the computer can provide the benefit of the protective shelter of the recessed location and overcome the hindered effectiveness of an antenna integrated with the portable electronic device.

Use of a standard connection for coupling a modular device, such as the portable electronic device, to antennas provided by the computer provides benefit even without the protection provided by a recessed location. Additionally, the standard connection including the radio frequency contacts may simplify the movement of the portable electronic device among a plurality of computers. This may allow a user to have a single wireless communication subscriber account for the portable electronic device and use this communication subscription to communicate wirelessly using a desktop computer at work, to communicate wireless using a shared computer at a client and/or vendor facility, to communicate wireless using a community computer at a hotel while traveling, with a computer at home, and in other circumstances.

Turning now to FIG. 1, a system 100 is described. A portable electronic device 102 comprises a radio transceiver 104, a first processor 106, and a first standard connector 108. The first standard connector 108 comprises at least one radio frequency contactor coupled to a first radio frequency line 110 and a plurality of data contactors coupled to a plurality of data communication lines 112. Another electronic device 130 comprises a second standard connector 132 that is suitable for coupling with the first standard connector 108. The second standard connector 132 comprises at least one radio frequency contactor that mates with the radio frequency contactor of the first standard connector 108 and promotes coupling the radio transceiver 104 to an internal antenna 136 and/or to an external antenna 138 via a second radio frequency line 134. It is understood that in an embodiment the radio transceiver 104 may be replaced by a radio transmitter and a radio receiver. The radio transceiver 104 and the processor 106 may be integrated on a single chip or may be implemented on separate chips. The processor 106 may comprise one or more of a central processor unit (CPU), a digital signal processor (DSP), a complex programmable logic device (CPLD), an application specific integrated circuit (ASIC), and/or other intelligent electronic components known to those of ordinary skill in the art.

In some contexts, the radio frequency lines 110, 134 may be referred to as radio frequency transmission lines or transmission lines. While the first radio frequency line 110 and the second radio frequency line 134 are depicted as single lines, it is understood that each radio frequency line 110, 134 may comprise at least two conductors, for example a first wire and a second wire, a stripline, a microstrip, and a coaxial cable. Alternatively, a portion of the radio frequency lines 110, 134 may comprise a wave guide. The radio frequency lines 110, 134 may also comprise other known radio frequency transmission line media.

In an embodiment, each first radio frequency line 110 is coupled to two radio frequency contactors in the first standard connector 108. For example, an internal conductor of the first radio frequency line 110 may couple to a first radio frequency contactor in the first standard connector 108 and an external conductor of the first radio frequency line 110 may couple to a second radio frequency contactor in the first standard connector 108. Alternatively, a first extended planar conductor of the first radio frequency line 110 may couple to a first radio frequency contactor of the first standard connector 108 and a second extended planar conductor of the first radio frequency line 110 may couple to a second radio frequency contactor of the first standard connector 108. Likewise, in an embodiment, each second radio frequency line 134 is coupled to two radio frequency contactors in the second standard connector 132. The two radio frequency contactors associated with the first radio frequency line 110 in the first standard connector 108 mate with the corresponding two radio frequency contactors in the second standard connector 132 associated with the second radio frequency line 134. However, in an embodiment, the first radio frequency line 110 may be coupled to a single radio frequency contactor in the first standard connector 108, the second radio frequency line 134 may be coupled to a single radio frequency contactor in the second standard connector 132, and the single radio frequency contactors in the standard connectors 108, 132 may mate with each other.

In an embodiment, a plurality of first radio frequency lines 110, that is transmission lines, may couple the radio transceiver 104 to the first connector 108 and a plurality of second radio frequency lines 134, that is transmission lines, may couple the second connector 132 to one or more internal antennas 136 and/or to one or more external antennas 138 via two or more pairs of radio frequency contactors in the first and second standard connectors 108, 132. For example, two first radio frequency lines 110 may couple the radio transceiver 104 to two sets of radio frequency contactors (e.g., four radio frequency contactors) in the first standard connector 108, two second radio frequency lines 134 may couple two antennas 136, 138 to two sets of radio frequency contactors (e.g., four radio frequency contactors) of the second standard connector 132, and the two sets of radio frequency contactors in the first standard connector 108 mate with the two sets of radio frequency contactors in the second standard connector 132. The plurality of first radio frequency lines 110 may promote coupling a transmit channel of the radio transceiver 104 to a first internal antenna 136 and a receive channel of the radio transceiver 104 to a second internal antenna 136, thereby enabling full-duplex radio communication. Alternatively, the plurality of first radio frequency lines 110 may promote coupling a first transmit/receive channel of the radio transceiver 104 to a first internal antenna 136 and a second transmit/receive channel of the radio transceiver 104 to a second internal antenna 136, thereby enabling half-duplex multiple input/multiple output (MIMO) communications by the radio transceiver 104. In another embodiment, more radio frequency lines 110, 134 and more contactors on each of the first and second standard connectors 108, 132 may be provided to promote additional radio frequency coupling.

The operation mode of the radio transceiver 104 may be controlled by the first processor 106. The first processor 106 may configure and/or control the operational mode of the radio transceiver 104 in response to data and/or control messages received over the data contactors of the first standard connector 108. These data and/or control messages may be transmitted to the first processor 106 by a second processor 142 in the electronic device 130. The data and/or control messages may be referred to in some contexts as a baseband signal or base band messages.

In an embodiment, three first radio frequency lines 110 may couple the radio transceiver 104 to three sets of radio frequency contactors (e.g., six radio frequency contactors) in the first standard connector 108, three second radio frequency lines 134 may couple three antennas 136, 138 to three sets of radio frequency contactors (e.g., six radio frequency contactors) of the second standard connector 132, and the three sets of radio frequency contactors in the first standard connector 108 mate with the three sets of radio frequency contactors in the second standard connector 132. In an embodiment, four first radio frequency lines 110 may couple the radio transceiver 104 to four sets of radio frequency contactors (e.g., eight radio frequency contactors) in the first standard connector 108, four second radio frequency lines 134 may couple four antennas 136, 138 to four sets of radio frequency contactors (e.g., eight radio frequency contactors) of the second standard connector 132, and the four sets of radio frequency contactors in the first standard connector 108 mate with the four sets of radio frequency contactors in the second standard connector 132. As discussed above, the radio transceiver 104 may be configured and/or controlled by the first processor 106 in response to data and/or control messages received via one or more data contactors of the first standard connector 108 from the second processor 142 in the electronic device 130. These data and/or control messages may be referred to as baseband signals and/or baseband messages. In some circumstances, the data and/or control messages may comprise content that may be transmitted by the radio transceiver 104. Additionally, the data and/or control messages may comprise content that is received and demodulated by the radio transceiver 104, forwarded to the first processor 106, and send by the first processor 106 to the second processor 142.

A wide variety of alternative implementations of the electronic device 130 having different configurations of antennas 136, 138 and different configurations of second radio frequency lines 134 are contemplated by the present disclosure. It is contemplated that the electronic device 130 may comprise a plurality of the second standard connectors 132 each of which may be connected to the second radio frequency line 134. Additionally, when two or more first radio frequency lines 110 are supported by the first standard connector 108, as discussed above, each of the second standard connectors 132 may couple to two or more second radio frequency lines 134. A switch (not shown) may be employed to connect only one of the second standard connectors 132 to the antennas 136, 138 at one time. The switch may be controlled by the second processor 142 in the second electronic device 130 based on sensing what devices may be coupled to the second standard connectors 132 or based on a user of the electronic device inputting a command identifying which second standard connector 132 to couple to the antenna 136, 138. The switch may be a mechanical type of switch such as a multi-position radio frequency switch. Alternatively, the switch may be an electronic radio frequency switch or solid-state radio frequency switch, for example a gallium arsenide (GaAs) pseudomorphic high-electron mobility transistor (pHEMT) radio frequency switch, a complimentary metal oxide semiconductor (CMOS) radio frequency switch, or another solid-state radio frequency switch.

It is well known to those skilled in the art that antenna structures, antenna couplers, and radio frequency transmission lines may be designed and/or selected for use over a specific intended frequency spectrum. Hence, the electronic device 130 may comprise a plurality of internal and/or external antennas 136, 138 for supporting wireless communications according to a plurality of different wireless communication protocols. For example, the electronic device 130 may comprise a first internal antenna 136 to support a first wireless communication protocol associated with a first frequency spectrum, a second internal antenna 136 to support a second wireless communication protocol associated with a second frequency spectrum, a third internal antenna 136 to support a third wireless communication protocol associated with a third frequency spectrum, and so on with yet more wireless communication protocols being supported with additional internal antennas 136. Alternatively, one or more external antennas 138 may be coupled to the electronic device 130 to support one or more wireless communication protocols.

The antennas 136, 138 may comprise patch antennas, dipole antennas, monopole antennas, loop antennas, rhombic antennas, vantenna antennas, discone antennas, log-periodic antennas, Yagi-Uda antennas, parabolic antennas, helical antennas, and other antenna structures. The antennas 136, 138 may comprise multiple antenna elements to achieve enhanced directionality and/or gain, for example an array antenna composed of two or more active or passive dipole elements. In some circumstances antenna directionality may be desirable. In other circumstances antenna directionality may be undesirable. The antennas 136, 138 additionally may be selected to operate in one or more selected frequency bandwidths. One skilled in the art will readily be able to select an appropriate antenna type for use as the internal antenna 136 and/or the external antenna 138.

The electronic device 130 may comprise one or more radio frequency switches for coupling the second standard connectors 132 to the plurality of antennas 136, 138. For example, a network or matrix of radio frequency switches may promote the second processor 142 arbitrarily connecting any second standard connector 132 to any antenna 136, 138, for example based on a wireless protocol supported by the portable electronic device 102 coupled to the second standard connector 132.

The plurality of antennas 136, 138 may also support multiple input-multiple output (MIMO) wireless communication. As is well known to those skilled in the art, MIMO may be used to increase the reliability of wireless communication, for example to overcome a degraded wireless communication channel, or to increase the throughput of wireless communication, for example in a high quality wireless communication channel. To support MIMO wireless communication, the radio transceiver 104 may transmit over two first radio frequency lines 110 that are coupled to two second radio frequency lines 134 that are coupled by radio frequency switches to a first internal antenna 136 and to a second internal antenna 136 that are designed for operating in the same frequency spectrum. The radio transceiver 104 may receive over the same two first radio frequency lines 110 coupled to the same two second radio frequency lines 134 coupled by the radio frequency switches to the same internal antennas 136. This may be referred to as a half-duplex mode of operation. In this half-duplex mode of operation, the radio transceiver 104 at any given time may transmit or receive but not both transmit and receive.

Alternatively, the radio transceiver 104 may transmit over first and second first radio frequency lines 110 and receive over third and fourth first radio frequency lines 110. The first, second, third, and fourth first radio frequency lines 110 may be coupled to four second radio frequency lines 134 that are coupled to four internal antennas 136—two internal antennas 136 for transmitting and two internal antennas 136 for receiving.

Because the standard connectors 108, 132 are standard connectors, the number of radio frequency contactors provided would be determined by the subject standards body. A greater number of radio frequency contactors provides greater radio frequency communication operations flexibility. On the other hand, there typically is a desire by standards body members for limiting the number of contactors or pins in a standard connector. In a context of a limited number of contactors or pins in a standard connector, there typically are competing proposals for allocating the role of the limited number of contactors or pins. Consequently, a standard connector 108, 132 may be defined by the governing standards body to include a single radio frequency contactor, two radio frequency contactors, four radio frequency contactors, or some other modest number of radio frequency contactors. The discussions above are intended to indicate that, given a fixed standard definition of connectors having one or more radio frequency contactors, the designs of the portable electronic device 102 and/or the electronic device 130 can suitably use these radio frequency contactors in a variety of ways.

The portable electronic device 102 may be a radio card, a mobile phone, a handset, or other electronic device. A handset is described in more detail hereinafter. The electronic device 130 may be a desktop computer, a laptop computer, a tablet computer, a notebook computer, or other computer device. The electronic device 130 may be a circuit board in a host computer, for example a circuit board in a network router. In an embodiment, the electronic device 130 may be a mobile broadband router that leverages the portable electronic device 102 to achieve wide area network (WAN) access.

The electronic device 130 may comprise the second processor 142 that communicates with the first processor 106 via a plurality of data communication lines 140 via a plurality of data contactors of the second standard connector 132 that mate with the plurality of data contactors of the first standard connector 108. The second processor 142 may comprise one or more of a central processor unit (CPU), a digital signal processor (DSP), a complex programmable logic device (CPLD), an application specific integrated circuit (ASIC), and/or other intelligent electronic components known to those of ordinary skill in the art. In an embodiment, the electronic device 130 may be a computer. Computer systems are described in greater detail hereinafter.

The data communication lines 112, 140 may communicate at what may be referred to as a baseband frequency to distinguish this kind of communication from the radio frequency communication that takes place over the radio frequency lines 110, 134 and involving the radio transceiver 104 and one or more of the antennas 136, 138. The information communicated between the first and second processors 106, 142 may comprise commands. The information may comprise content sent from the second processor 142 to the first processor 106 to be transmitted wirelessly by the radio transceiver 104 from one or more of the antennas 136, 138. The information may comprise content received wireless by the radio transceiver 104 from one or more the antennas 136, 138 and sent from the first processor 106 to the second processor 142.

A communication standard may define the configuration of the connectors 108, 132, signal levels on the connectors, signal roles, and other like characteristics. A communication standard may be developed or negotiated by an industry standards body comprising member companies and/or member manufacturers. A communication standard may have an objective to promote interoperability of devices manufactured by different manufacturers. Proprietary interfaces and/or connectors may be developed by one or more companies or manufacturers. A proprietary interface or solution may be characterized by the lack of consensus of other companies and manufacturers, at least at the time of the initial introduction of the subject proprietary interface or solution. A shortcoming of proprietary interfaces and solutions is that not all manufacturers may support the subject proprietary interface, and hence equipment may operate with some devices and not with others. A proprietary interface or solution may be developed as a work-around to limitations of existing standards definitions and may permit a manufacturer to quickly roll-out a new feature that provides product differentiation. Notwithstanding, such work-arounds and proprietary solutions typically do not support interoperability of equipment manufactured by different equipment manufacturers, for example a portable electronic device 102 made by a first equipment manufacturer and an electronic device 130 made by a second equipment manufacturer unallied with the first equipment manufacturer.

The physical configurations, contactor roles, signal levels, and other characteristics of the first standard connector 108 and the second standard connector 132 may conform to a communication standard to promote plug-and-play communication among devices manufactured by different parties. For example, the physical dimensions of the first standard connector 108 and the second standard connector 132 may conform to a standard. In an embodiment, the first standard connector 108 and the second standard connector 132 may conform to a version of the universal serial bus (USB) standard or to another standard. The first standard connector 108 may comprise pins that mate with sockets of the second standard connector 132. The first standard connector 108 may comprise sockets that mate with pins of the second standard connector 132. The first standard connector 108 may comprise contactors that are spring loaded to remain in contact with corresponding spring loaded contactors in the second standard connector 132. Alternatively, the first standard connector 108 and the second standard connector may electrically couple to each other using other techniques and mechanisms known to those of ordinary skill in the art.

In an embodiment, the portable electronic device 102 may comprise an antenna 114 for use when the portable electronic device 102 is operated independently, for example when the first standard connector 108 is not coupled to the second standard connector 132. The first processor 106 may control a switch 116 that couples the radio transceiver 104 selectively to one of the antenna 114 and/or to the first radio frequency line 110. The first processor 106 may control the switch 116 based on sensing when the first standard connector 108 is coupled to the second standard connector 132. Alternatively, the first processor 106 may control the switch 116 based on maintaining an operational state determined based on data communication with the electronic device 130, for example the second processor 142 may command the first processor 106 to operate the switch 116 to couple and/or decouple the radio transceiver 104 to the first radio frequency line 110. The switch 116 may be implemented in a variety of forms including via a solid state electronic radio frequency switch, for example a gallium arsenide (GaAs) pseudomorphic high-electron mobility transistor (pHEMT) RF switch or a complimentary metal oxide semiconductor (CMOS) RF switch. Alternatively, the switch 116 may be implemented as an electro-mechanical RF switch. In an alternative embodiment, rather than the first processor 106 commanding the switch 116, the radio transceiver 104 may sense the impedance of the first radio frequency line 110 and select to couple to either the antenna 114 or to the first radio frequency line 110 based on the sensed impedance.

In another embodiment, however, the portable electronic device 102 may not include the switch 116. In this embodiment, the portable electronic device 102 may not include the antenna 114 and may rely upon at least one of the internal antenna 136 and the external antenna 138. In this case, the radio transceiver 104 may be directly coupled to the first radio frequency line 110 without passing through any switch. Alternatively, the radio transceiver 104 may be directly coupled to both the antenna 114 and to the first radio frequency line 110. This configuration may entail the radio transceiver 104 transmitting on both the antenna 114 and one or both of the antennas 136, 138. Likewise, this configuration may entail the radio transceiver 104 receiving from both the antenna 114 and one or both of the antennas 136, 138.

Figure 2:
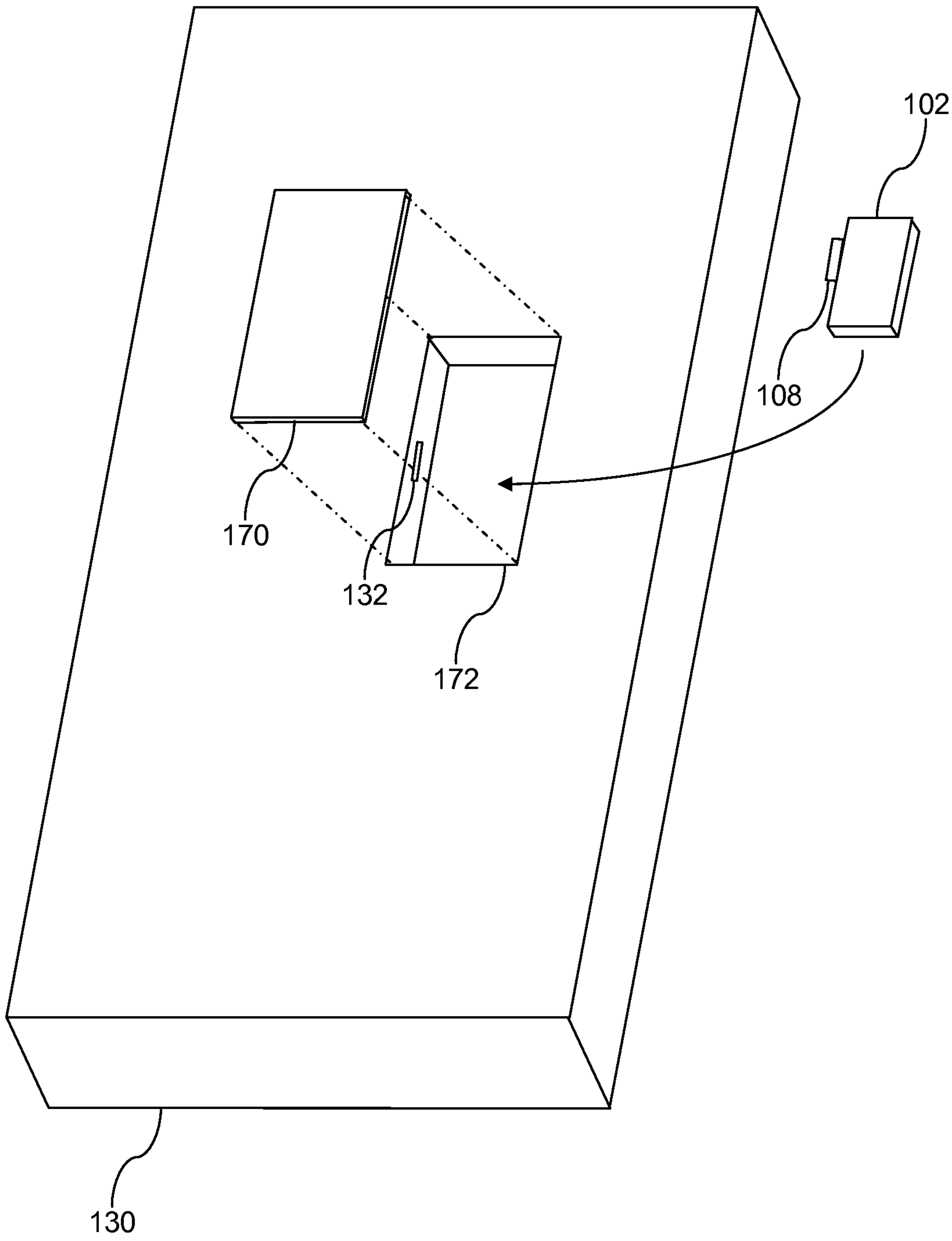
FIG. 2 is an illustration of a configuration of a system according to an embodiment of the disclosure.

Turning now to FIG. 2, a recess in an electronic device 130 is described. In an embodiment, the electronic device 130 may have a recess 172 suitable for receiving the portable electronic device 102 and for mating the first standard connector 108 to the second standard connector 132. The recess 172 may include some mechanical mechanism such as a clip, detent, friction fit, or other mechanism to retain the portable electronic device 102 within the recess 172. In an embodiment, the electronic device 130 may comprise a door 170 that covers the recess 172. The door 170 may be removable. Alternatively, the door 170 may be hinged to the electronic device 130, for example hinged to an external package of the electronic device 130. The door 170 may close with a snap, with a detent, with a clip, with a latch, or some other closure mechanism known to those of ordinary skill in the art. The recess 172 may protect the portable electronic device 102 from the environment including from sunlight, dust, spills such as coffee and/or soft drinks. Additionally, the recess 172 may protect the portable electronic device 102 from hazards such as dropped objects or collision with other objects as the electronic device 130 is carried with the portable electronic device 102 coupled to the electronic device 130. When installed in the recess 172, the effectiveness of the antenna 114 of the portable electronic device 102 may be attenuated, thereby making it advantageous for the portable electronic device 102 to transmit and receive radio frequency communications via the internal antenna 136 and/or the external antenna 138 of the electronic device 130.

Figure 3:
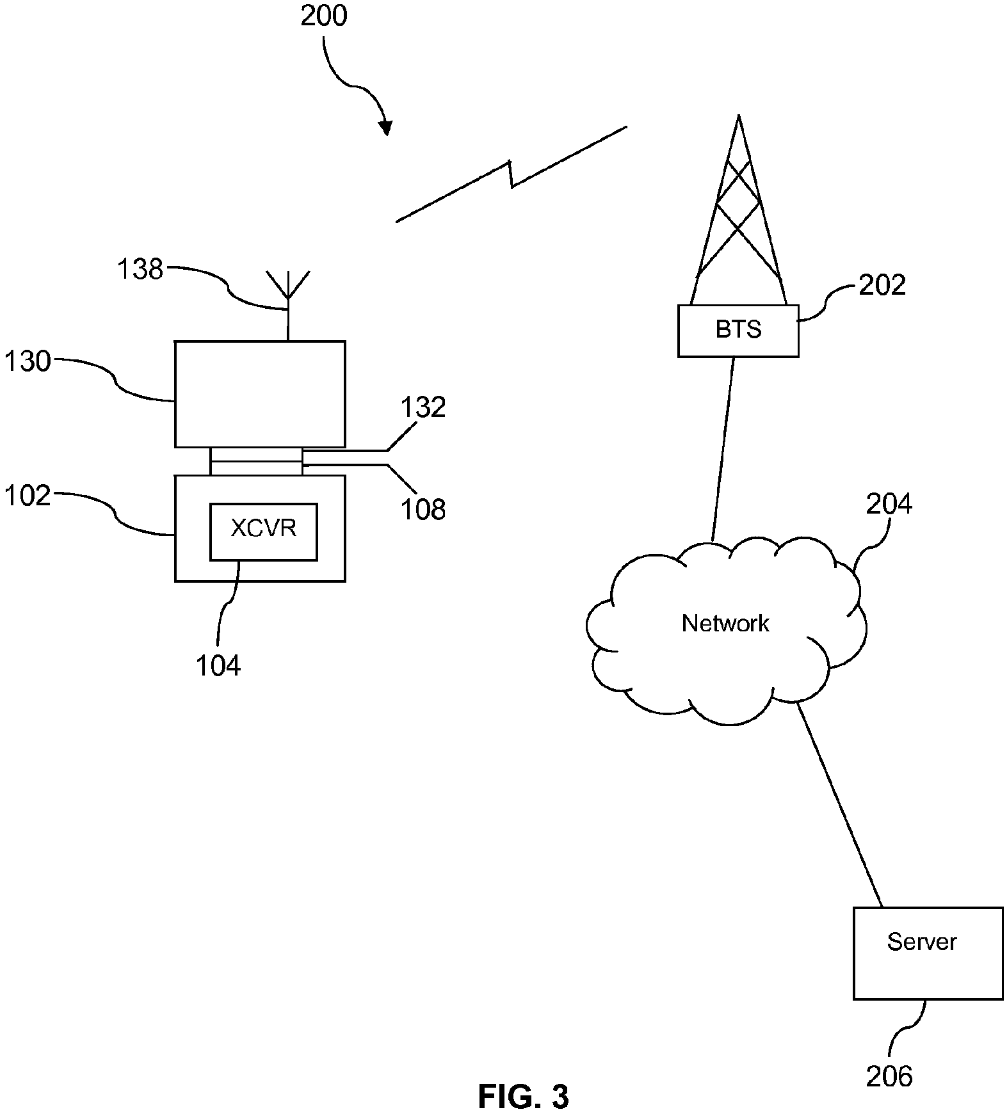
FIG. 3 is a block diagram of a communication system according to an embodiment of the disclosure.

Turning now to FIG. 3 a wireless communication system 200 is discussed. The system 200 comprises the portable electronic device 102 coupled to the computer 130 by the connectors 108, 132. The system 200 further comprises a base transceiver station 202 or other wireless access point, a network 204, and a server 206. The radio transceiver 104 transmits and receives via the external antenna 138 or the internal antenna 136 (not shown in FIG. 3), as described further above, and is in wireless communication to the base transceiver station 202 or other wireless access node. The base transceiver station 202 or other wireless access node is coupled to the network 204, thereby providing communication between the radio transceiver 104 and the network 204. The server 206 is coupled to the network 204 accessible by the radio transceiver 104 via the network 204. The base transceiver station 202 or other wireless access node provides the wireless link to the radio transceiver 104 using any of code division multiple access (CDMA), global system for mobile communication (GSM), long-term evolution (LTE), world-wide interoperability for microwave access (WiMAX), and other wireless protocols. The base transceiver station 202 may provide wireless data communication service to the radio transceiver 104 using any of one-times radio transmission technology (1x-RTT), evolution data only (EV-DO), high speed packet data (HSPD), LTE, WiMAX, or other wireless protocols. The network 204 may comprise any combination of public networks, private networks. The network 204 may comprise any combination of a public switched telephone network and a mobile telephone network. At least a portion of the network 204 may comprise the Internet. The server 206 may be implemented as a computer system. The server 206 may provide access to content or may serve functional requests transmitted by the radio transceiver 104.

FIG. 4 shows a block diagram of a handset 500. In an embodiment, the handset 500 may embody the portable electronic device 102. While a variety of known components of handsets 500 are depicted, in an embodiment a subset of the listed components and/or additional components not listed may be included in the mobile device handset 500. The handset 500 includes a digital signal processor (DSP) 502 and a memory 504. As shown, the handset 500 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 500 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 500 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 500 to send and receive information from a radio access network (RAN) or some other available wireless communications network or from a peer handset 500. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 500 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 500 to function as a peripheral device to exchange information with a personal computer or other computer system. The infrared port 524 and other optional ports such as a Bluetooth interface or an IEEE 802.11 compliant wireless interface may enable the handset 500 to communicate wirelessly with other nearby handsets and/or wireless base stations.

The input/output interface 518 may further connect the DSP 502 to the vibrator 526 that, when triggered, causes the handset 500 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 500. Another input mechanism may be the touch screen LCD 530, which may also display text and/or graphics to the user. The touch screen LCD controller 532 couples the DSP 502 to the touch screen LCD 530.

The CCD camera 534 enables the handset 500 to take digital pictures. The DSP 502 communicates with the CCD camera 534 via the camera controller 536. The GPS sensor 538 is coupled to the DSP 502 to decode global positioning system signals, thereby enabling the handset 500 to determine its position. In another embodiment, a camera operating according to a technology other than charge coupled device cameras may be employed. Various other peripherals may also be included to provide additional functions, e.g., radio and television reception.

Figure 6:
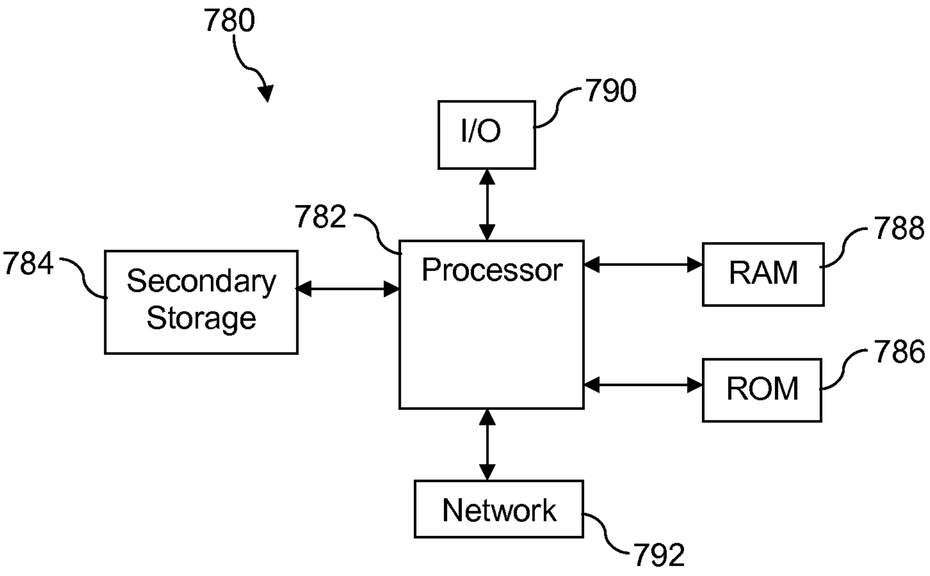
FIG. 6 illustrates an exemplary computer system suitable for implementing some aspects of the several embodiments of the disclosure.

FIG. 5 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the handset 500. Also shown in FIG. 6 are a web browser application 608, a media player application 610, and JAVA applets 612. The web browser application 608 configures the handset 500 to operate as a web browser, allowing a user to enter information into forms and select links to retrieve and view web pages. The media player application 610 configures the handset 500 to retrieve and play audio or audiovisual media. The JAVA applets 612 configure the handset 500 to provide games, utilities, and other functionality.

FIG. 6 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and the ROM 786 may be referred to in some contexts as non-transitory storage or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts and/or data that may be accessed from the secondary storage 784, such as a hard drive, a floppy disk, an optical disk, or other storage device, the ROM 786, and the RAM 788 may be referred to in some contexts as non-transitory instructions or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electronic device, comprising:

a radio transceiver;

an internal processor;

a memory;

a connector comprising a first set of contacts, wherein the first set of contacts transmit a first radio frequency signal between the radio transceiver and a first external antenna and a second set of contacts, wherein the second set of contacts transmits a baseband signal between the internal processor and an external processor; and an application stored in the memory that, when executed by the internal processor, manages the radio transceiver based on the baseband signal received over the second set of contacts from the external processor, causes the radio transceiver to transmit the first radio frequency signal over the first set of contacts to the first external antenna, and causes the radio transceiver to receive the first radio frequency signal over the first set of contacts from the first external antenna.

2. The device of claim 1, wherein the first set of contacts comprises two contacts for transmitting the first radio frequency signal to the first external antenna and two different contacts for receiving the first radio frequency signal from the first external antenna.

3. The device of claim 1, wherein the first set of contacts comprises two contacts for transmitting and receiving the first radio frequency signal to and from the first external antenna and the first set of contacts comprises two additional contacts for transmitting and receiving a second radio frequency signal to and from a second external antenna.

4. The device of claim 1, wherein the external processor is embedded in a computer to which the electronic device is coupled via the connector.

5. The device of claim 1, wherein the electronic device further comprises an internal antenna.

6. The device of claim 1, wherein the electronic device comprises an internal antenna, and wherein the processor decouples the internal antenna from the radio transceiver responsive to the connector being coupled to the first external antenna.

7. The device of claim 1, wherein the electronic device receives power from an external power source via the connector.

8. A system, comprising:

a computer comprising a package housing a computer processor, a memory, and a first connector coupled to the computer processor and to a first antenna; and an electronic device, comprising:

a radio transceiver;

a device processor;

a device memory;

a second connector comprising a first set of contacts, wherein the first set of contacts transmits a first radio frequency signal between the radio transceiver and the first connector, and a second set of contacts, wherein the second set of contacts transmits a baseband signal between the device processor and the first connector; and an application stored in the device memory that, when executed by the device processor, controls the radio transceiver based on the baseband signal received over the second set of contacts from the computer processor via the first connector, causes the radio transceiver to transmit the first radio frequency signal over the first set of contacts of the second connector to the first antenna, and causes the radio transceiver to receive the first radio frequency signal over the first set of contacts of the second connector from the first antenna via the first connector, wherein the package receives the electronic device in a recessed compartment.

9. The system of claim 8, wherein the first antenna is contained within the package.

10. The system of claim 8, wherein the first antenna is an external antenna coupled to the computer by a third connector.

11. The system of claim 8, wherein the first connector is further coupled to a second antenna, and wherein the application controlling the radio transceiver further causes the radio transceiver to transmit a second radio frequency signal over the first set of contacts of the second connector to the second antenna, and causes the radio transceiver to receive the second radio frequency signal over the first set of contacts of the second connector from the second antenna.

12. The system of claim 11, wherein the radio transceiver operates in a multiple-input, multiple-output (MIMO) mode.

13. The system of claim 8, wherein the radio transceiver communicates according to one of one-times radio transmission technology (1x-RTT), evolution data only (EV-DO), high speed packet data (HSPD), worldwide interoperability for microwave access (WiMAX), and long-term evolution (LTE).

14. The system of claim 8, wherein the package comprises a panel which opens to receive the electronic device and which closes when the second connector is coupled to the first connector, whereby the electronic device is protected.

15. The system of claim 14, wherein the electronic device comprises a third antenna and wherein the device processor decouples the third antenna from the radio transceiver in response to the device processor determining that the second connector is coupled to the first connector.

16. The system of claim 8, wherein the baseband signal is a serial communication signal.

17. An electronic device, comprising:

a processor;

a memory;

a connector for coupling the electronic device to a computer, the connector comprising a first contactor and a second contactor, wherein the first and second contactors transmit a first radio frequency signal between a radio transceiver of the electronic device and an antenna of the computer, and the connector further comprising a third contactor, wherein the third contactor transmits a baseband signal between a processor of electronic device and the computer; and an application stored in the memory that, when executed by the processor, manages the generation of the first radio frequency signal based on the baseband signal received over the third contactor from the computer, causes the radio transceiver of the electronic device to transmit the first radio frequency signal over the first and second contactors to the antenna of the computer, and causes the radio transceiver of the electronic device to receive the first radio frequency signal over first and second contactors from the antenna of the computer.

18. The electronic device of claim 17, wherein the connector further comprises a fourth contactor and a fifth contactor configured to transmit a second radio frequency signal between the electronic device and the computer, and wherein the application further manages the generation of the second radio frequency signal based on the baseband signal.

19. The electronic device of claim 18, wherein the connector further comprises a sixth contactor and a seventh contactor configured to transmit a third radio frequency signal between the electronic device and the computer, wherein the connector further comprises an eighth contactor and a ninth contactor configured to transmit a fourth radio frequency signal between the electronic device and the computer, and wherein the application further manages the generation of the third radio frequency signal and the fourth radio frequency signal based on the baseband signal.

20. The electronic device of 18, further comprising:

a first radio transceiver coupled to the first contactor and the second contactor, wherein the first radio transceiver is configured to generate the first radio frequency signal under control of the application, and a second radio transceiver coupled to the fourth contactor and the fifth contactor, wherein the second radio transceiver is configured to generate the second radio frequency signal under control of the application.

* * * * *